Dec. 20, 1932.  C. BOOTH ET AL  1,891,662
MACHINE TOOL
Filed Sept. 27, 1929  4 Sheets-Sheet 1

Inventor
CLEMENT BOOTH
FREDERICK S. HAAS
By
H. K. Parsons
Attorney

Dec. 20, 1932.   C. BOOTH ET AL   1,891,662
MACHINE TOOL
Filed Sept. 27, 1929   4 Sheets-Sheet 2
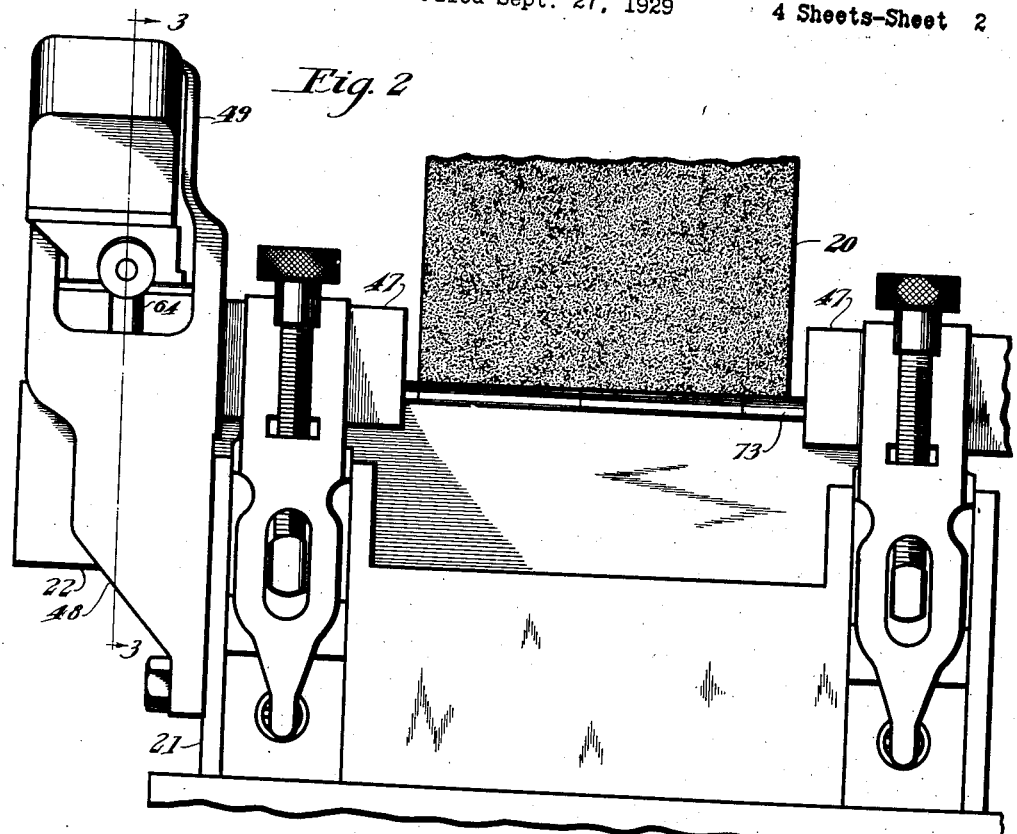
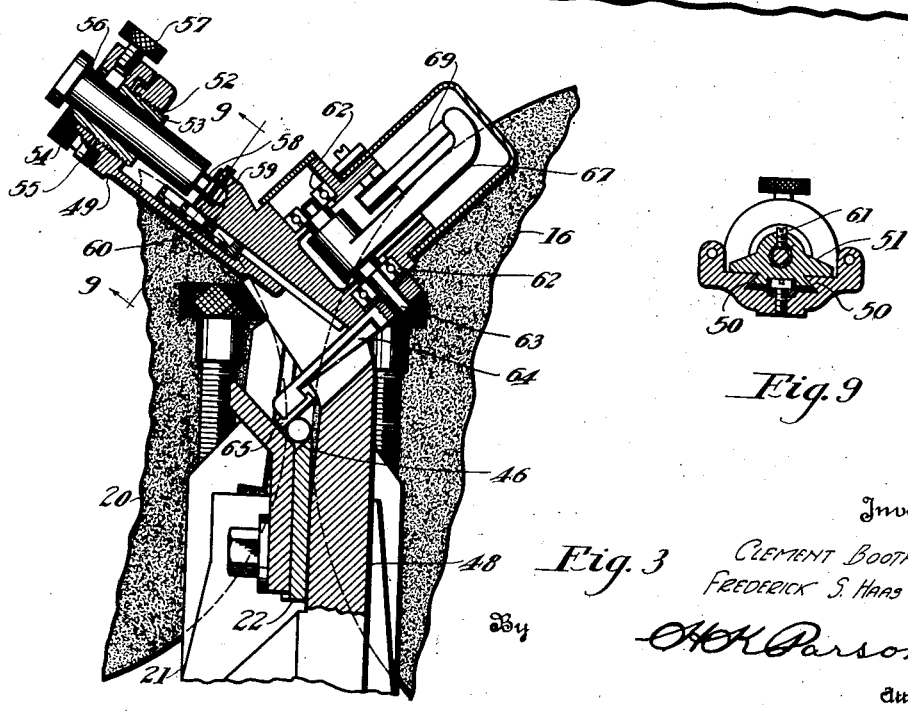
Inventor
CLEMENT BOOTH
FREDERICK S. HAAS
By
A. K. Parsons
Attorney Dec. 20, 1932.          C. BOOTH ET AL          1,891,662
                          MACHINE TOOL
              Filed Sept. 27, 1929        4 Sheets-Sheet 3
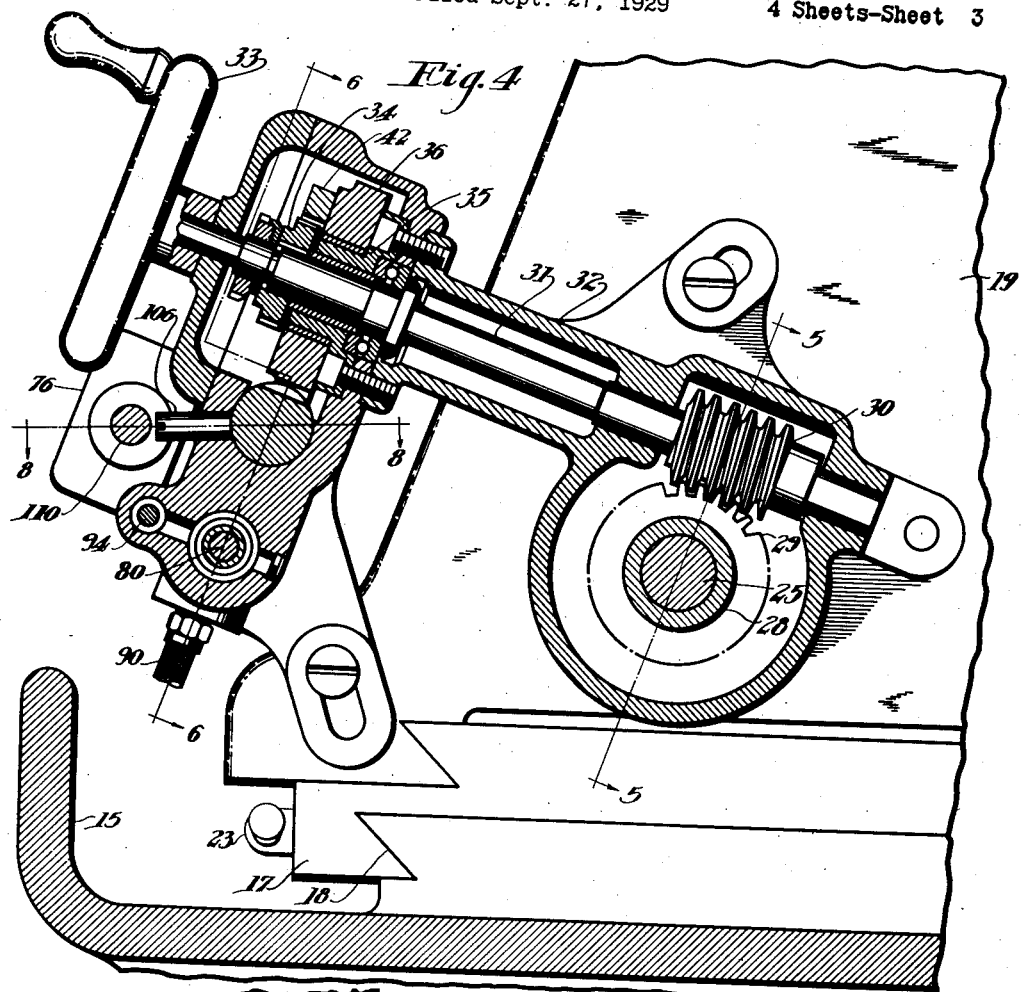
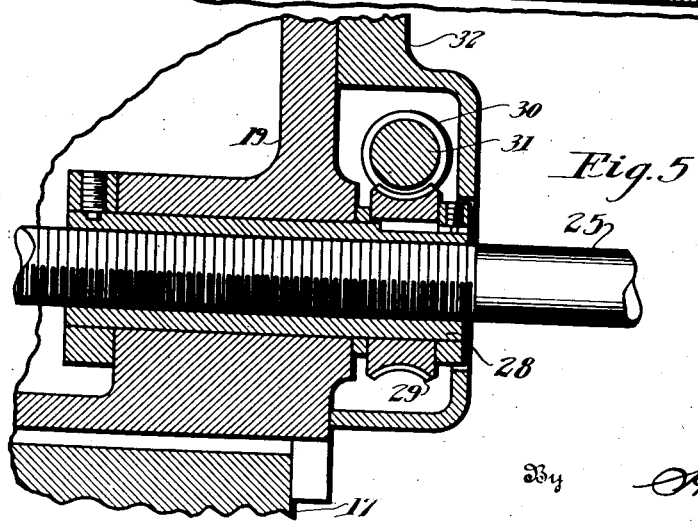
Inventor
CLEMENT BOOTH
FREDERICK S. HAAS
By H. K. Parsons
              Attorney

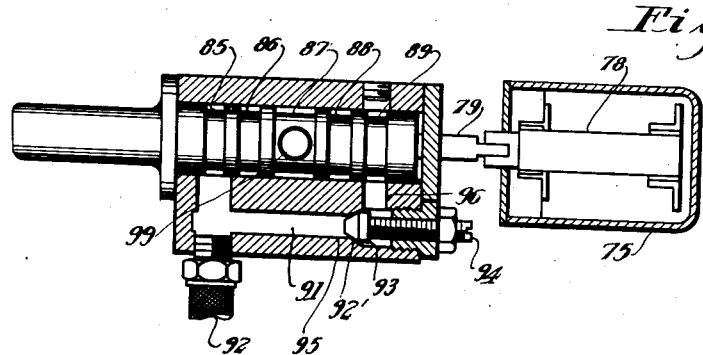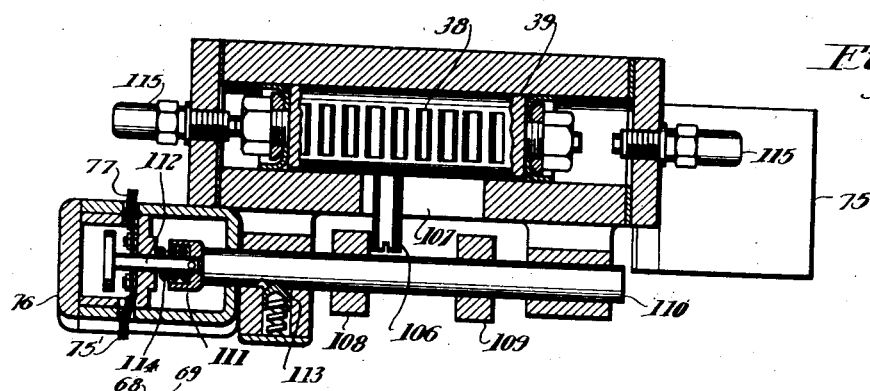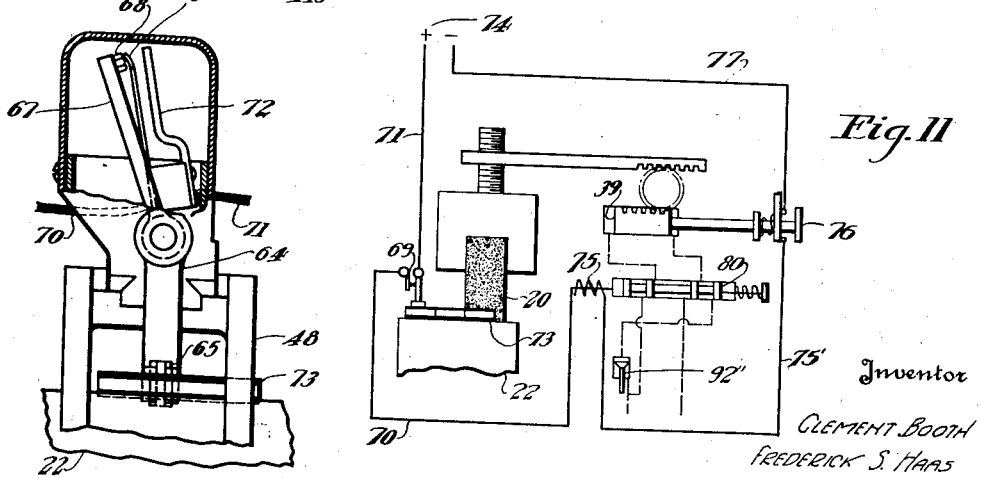

Patented Dec. 20, 1932

1,891,662

UNITED STATES PATENT OFFICE

CLEMENT BOOTH AND FREDERICK S. HAAS, OF CINCINNATI, OHIO, ASSIGNORS TO CINCINNATI GRINDERS INCORPORATED, OF CINCINNATI, OHIO, A CORPORATION OF OHIO

MACHINE TOOL

Application filed September 27, 1929. Serial No. 395,710.

This invention relates to improvements in machine tools and has particular reference to the adjusting mechanism therefor for determination of size of work piece produced thereby.

Present day production mechanisms have been developed to a point where work pieces may be produced within precision limits of one or two ten thousandths of an inch with the result that manufacturers establish such limits as their standards and require that work dimensions whether of flat plates, cylindrical members such as piston pins for example or the like be produced to within these limits. When the manufacture is performed by grinding, the removal of stock from the work is accompanied by a certain wear or breaking down of the tool or grinding wheel so that in a continuous production run it is necessary that the work piece be frequently gauged or measured and if found oversize, due to such wear, the machine producing the same must be readjusted to compensate therefor. Ordinarily, in the past, these gauging and adjusting operations have been manually performed demanding constant attention of the operator.

One of the principal objects of the present invention is the provision of an automatic adjusting mechanism for a machine tool which will maintain substantial uniformity of size of successive work pieces produced thereby.

A further object of the present invention is the provision of a mechanism particularly adapted for application to centerless grinders or other machine tools in which a series of work pieces are successively operated on by a grinding or cutting tool which will serve to gauge the work pieces as completed and make proper relative adjustment of the work supporting and cutting members to compensate for wear of the tool or the like and maintain the finished dimension of all work pieces of the series within the prescribed precision limits.

A further object of the invention is the provision in connection with a work gauging mechanism disposed remote from the operative throat of the machine for actuation of the feed mechanism therefore, of a timed actuation retarding mechanism for preventing repeat actuation of the feed until a work piece ground by the new setting has progressed into size determining relation with the gauging mechanism.

A further object of the invention is the provision of a mechanism particularly adapted for application to a through feed centerless grinder and actuable by engagement with the work as discharged therefrom for automatically maintaining a prescribed relation of grinding and regulating wheels to the end that a series of work pieces may be continuously fed through the machine and ground to within prescribed precision size limits without necessitating manual gauging thereof or adjustment of the machine by the operator.

Other objects and advantages of the present invention should be readily apparent by reference to the following specification considered in conjunction with the accompanying drawings and it will be understood that any modifications may be made in the specific structural details hereinafter described within the scope of the appended claims without departing from or exceeding the spirit of the invention.

Figure 2 is an enlarged transverse section on the line 2—2 of Figure 1.

Figure 3 is a vertical section through the feeler or gauging mechanism as on line 3—3 of Figure 2.

Figure 4 is a section through the automatic or fine feed adjusting mechanism taken as on line 4—4 of Figure 1.

Figure 5 is a section on line 5—5 of Figure 3.

Figure 7 is a horizontal section through the valve casing with the valve bushing shown in elevation as on line 7—7 of Figure 6.

Figure 8 is a section illustrating the cutout switch and automatic control therefor taken as on line 8—8 of Figures 1 and 4.

Figure 9 is a section through the sizing device slide as on line 9—9 of Figure 3.

Figure 10 is a fragmentary view of the work feeler and closing members associated therewith, and Figure 11 is a diagrammatic view of the electrohydraulic control circuits.

In the production of cylindrical work the commercial centerless grinding machine is today recognized as most rapid in accurate operation since the work pieces may be fed therethrough in a continuous stream with constant performance of the grinding operation and at an axial rate, depending upon the material, stock removal and other variables. The demands upon a mechanism for automatically maintaining prescribed accuracy in the finished product are therefore exceptional and in view of its efficiency in meeting demands of this nature the invention has been illustrated as applied to this type of machine tool.

Figure 1:
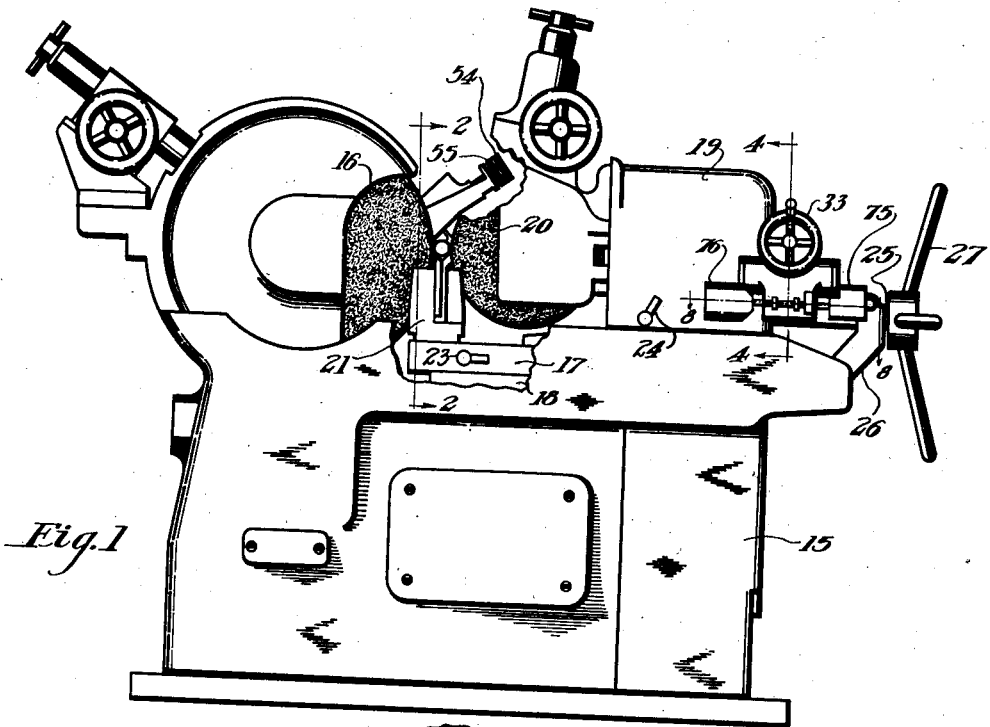
Figure 1 is a front elevation of a centerless grinder having improved control mechanism applied thereto.

Such a centerless grinder as shown in Figure 1 includes a bed 15 having mounted thereon a grinding wheel 16 rotatable at a high grinding rate of speed in a clockwise direction.

Disposed on the bed in opposition to the grinding wheel is a work holding or supporting mechanism primarily carried by a slide 17 guided by ways 18 on the bed. This slide in turn has adjustably mounted thereon a carriage 19 bearing a regulating wheel 20 also rotatable in a clockwise direction but at a slow rate of speed for frictionally engaging the work and determining the rate of rotation thereof. This regulating wheel may have its axis angularly disposed as respects that of the grinding wheel to exert a thrust component causing a continuous feed of successive work pieces through the grinding throat between the two wheels.

Slide 17 has rising therefrom a bracket 21 for the work rest unit and associate parts. These parts include a work rest blade 22 along which the work pieces move and which serves to complete the throat for separate rotation and grinding.

Suitable clamps 23 and 24 are provided serving respectively to clamp the slide 17 to the bed 15 and the carriage 19 to the slide 17. As a result the carriage 19 may be shifted on slide 17 for adjustment relative the work rest bracket or the parts may be clamped to the slide 17 so that the work rest bracket and regulating wheel will together receive a unitary movement.

The general adjustment of these parts is effected by a screw 25 swiveled in a bracket 26 carried by the bed 15 and operable by pilot wheel 27. This screw extends forwardly and is engaged in a sleeve nut 28 rotatably mounted in the rear portion of carriage 19. This sleeve nut bears a worm gear 29 having in mesh therewith an adjusting worm 30 on shaft 31. This shaft is journaled in a bracket 32 on carriage 19 and at its forward end is provided with a hand wheel 33 for manual adjustment thereof. In addition, shaft 31 has keyed thereon near its forward end a ratchet 34.

Carried by the bracket and circumscribing an intermediate portion of the shaft is a flange bushing 35 rotatably supporting the disc 36 having a segmental or circumferential rack portion 37 adapted to mesh with rack 38 on piston 39 slidable in cylinder 40 of the bracket. This disc has intermittently pivoted thereto as at 41 the arcuate pawl 42 having one end adapted for engagement with the teeth of ratchet 34 as the disc and pawl are moved in a clockwise direction and having the opposite end pressed downward for such engaging relation by spring 43. This end is additionally bevelled as at 44 for engagement by adjustable kick-out screw 45 on bracket 32. On reverse or counter-clockwise oscillation of the disc cooperative engagement of screw 45 and terminal portion 44 of the pawl inwardly moving and holding the pawl in disengaged relation to the ratchet. This serves as a limitation of the engaging point of the pawl on reverse movement and also permits free rotation of the shaft in either direction by wheel 33 when it is desired to manually adjust sleeve nut 28 and thus the units 17 or 19.

The automatic work size control mechanism comprises two coupled units, the one comprising a work contacting shoe or gauging device and associate parts located adjacent the grinding throat for measurement of discharge work pieces, and mounted on the support 21, the other including the pawl ratchet and piston mechanism just referred to carried by the bracket 32.

The work engaging mechanism is particularly illustrated in Figures 2, 3, 9 and 10. The work rest blade 22 has an angularly disposed upper work supporting surface 46 inclined in the direction of the regulating wheel 20 and forming therewith a trough for support of the work piece during the grinding, the two parts being so adjusted that the work will project a proper amount laterally beyond the work rest blade for engagement by the grinding wheel 16. Adjacent the wheels at the throat are suitable guide members 47 for insuring proper aligned entrance and discharge of the work. At the discharge end of the work rest blade is disposed a bracket 48 having a laterally deflected upper portion 49 formed with ways 50 for slide 51. At the upper end, the ways portion 49 has a thread socket 52 receiving the threaded sleeve 53 having the knurled head 54 provided with micrometer dial 55. Slidable within the sleeve is a plunger 56 which may be clamped thereto as by screw 57. Plunger 56 has a reduced terminal portion 58 formed with a cannular 59. This terminal portion is rotatably secured in socket 60 of slide 51 by a set screw 61 engaged in the cannular.

Supported by the inner end of the slide in anti-friction bearings 62 is a spindle 63 on which is secured rock arm 64 terminating in shoe 65 forming a feeler adapted to be positioned to overlie the laterally extending portion of the work rest blade 22 in spaced relation thereto. Course adjustment of the slide and thus the position of the shoe with respect to the work supporting face 46 of plate 22 may be readily effected by loosening of screw 57 and suitable back and forth adjustment of plunger 56 bringing the shoe in position to just clear a work piece of the prescribed finished diameter. Screw 57 is designated to lock plunger securely within sleeve 53. The necessary fine or micrometer adjustment of the feeler can thus be effected by grasping and rotating knurled head 54 the pitch of the screw threads on the sleeve and diameter of the dial portion 55 preferably being such that indicated movements of one ten thousandth of an inch may be thus accurately determined and effected.

Spindle 63 is further provided intermediate its ends with rock arm 67. This arm has an insulated abutment 68 for engagement with blade spring 69. Spring 69 is supported by the lower end of the slide in insulated relationship thereto and serves a double purpose. Its tension normally urges arm 67 to the left as viewed in Figure 10 or away from the grinding and regulating wheels causing a consequent swinging of member 65 in a direction toward the grinding throat. Also, this spring has coupled therewith lead 70 of the electric control circuit. A second lead 71 in this circuit is coupled with the insulated abutment arm 72 located in the path of movement of the blade spring as effected by an oscillation toward the right of arm 67, engagement of spring 69 with member 72 serving to close the electrical circuit. As the successive work pieces 73 emerge from the discharge side of the machine they move along the work rest and between shoe 65 and the supporting face of the work rest blade. So long as the pieces are being ground to correct size the shoe and its supporting arm are unaffected thereby. If a slightly oversize piece emerges from the machine and passes along this space there will be a slight binding action as respects the contact shoe and the friction drag of outward movement of the work will then be sufficient to oscillate spindle 63 against the pressure of spring 69 to an extent that the electrical control circuit will be complete.

Figure 6:
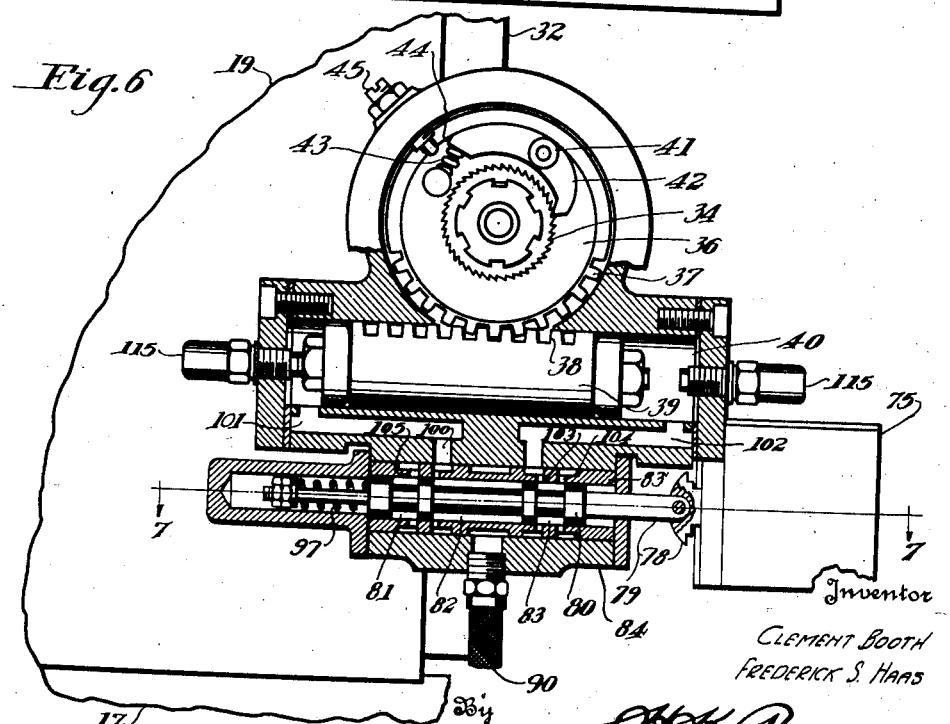
Figure 6 is a section through the automatic actuating mechanism for the feed adjustment as on the line 6—6 of Figure 4.

Referring to Figures 6 and 11 it will be noted that a suitable source of electrical energy has been indicated at 74, to lead 71 coupling same with finger 72 while the lead 70 extends from the circuit closing member 69 through solenoid 75 to interrupter 76 whence a return lead or conductor 77 completes the electrical circuit. Solenoid 75 has a core 78 coupled with valve stem 79. The valve proper 80 on the stem has a plurality of grooves indicated respectively at 81, 82 and 83 with suitable intermediate cylindrical portions having a sliding fit in the valve bushing 83' mounted in the casing 84 carried by the bracket 32. This bushing has the cannulars 85, 86, 87, 88 and 69. Cannular 87 is aligned with inlet 90 for the oil or hydraulic actuating medium under pressure while cannulars 85 and 89 are coupled with passage 91 over which extends the exhaust or discharge conduit 92. Passage 91 is formed with a seat 92' for cooperation with needle valve 93 adjustable by threaded stem 94 to vary the restricted discharge orifice at 95 from the passage 96.

When the solenoid is de-energized spring 97 shifts the valve to the position shown in Figure 6. The flow of the actuating medium is then from supply pipe 90 through cannular 87 port 99, groove 82, port 100 and passage 101 to the left hand end of the cylinder 40 urging the piston 39 to the right and oscillating disc 36 and pawl 42 into an inoperative or retracted position. At the same time liquid contained in the right hand end of the cylinder is exhausted through passage 102, cannular 88, port 103, port 104 and cannular 89 to passage 96. The retracted orifice at 95 serves to delay or retard the exhausting of the contained fluid so that the movement is a slow or gradual one.

When the electric control circuit is completed the solenoid is energized and reversely shifts the valve member. In this event the inlet of fluid is from 90 through 103, 88 to the right hand end of the cylinder shifting the piston over on its feeding stroke which is shown as just completed in Figure 6. In this instance the exhaust is through 101, 100, 105 and cannular 85 to passage 91. As there is no restriction in the exhaust at this side the movement of the piston is a rapid one effecting an immediate inward feeding of the regulating wheel unit to compensate for the excess in diameter of a finished work piece which has shifted the friction contact member to complete the electric circuit energizing the solenoid. The particular difference in the rate of movement of the piston in its two directions will be better understood by a consideration of Figure 8. It will be here noted that the piston 39 is provided with a laterally projecting pin 106 moving in slot 107 of the cylinder wall and oscillatable between adjustable abutments 108 and 109 on slide rod 110. Rod 110 has a socket at 111 receiving stem 112 of circuit interrupter 76 normally held in circuit closing position coupling leads 75' and 77. As the piston completes its movement in a feed actuating direction pin 106 engages abutment 108 moving rod 110 with the piston raising the load and fire detent 113. As the piston movement is completed detent 113 fires the rod to the left shifting the interrupter into the position shown in Figure 8 thus breaking the control circuit and de-energizing the solenoid. With the parts in this position the electrical circuit will therefore be inoperative irrespective of the relative position of contacts 69 and 72. During the reverse movement of piston 39, pin 106 rides idly between members 108 and 109 but as it reaches its retracted limit of movement pin 106 will engage with 109 again tensioning load and fire detent 113 which will eventually forcibly shift rod 110 out of restraining engagement with interrupter 76 when its spring 114 will retain the member in circuit closing position.

It will be appreciated that the rate of reverse movement of the piston and thus the time consumed before the work is rendered effective may be varied as desired by proper adjustment of the needle valve 93. The particular advantage attained by this construction resides in an inherent condition of the machine in the particular manner of mounting the mechanism here illustrated.

Due to the sensitivity of the size determining mechanism it is possible there might be slight fluctuations in size of successive work pieces as the new adjustment is automatically effected causing a momentary release and then re-engagement of the feeler controlled contacts. By temporarily opening the circuit therefore and allowing the machine to settle to its new adjustment during retarded return of the piston shuttling of the valve or the like due to such a condition is prevented. Normally, several pieces will have passed through the grinding throat and therefore passed beneath the drag shoe before the circuit is completed by the member 76 and the balance or equilibrium of the machine established. If the run of work is then below the prescribed excess limitation member 67 will be undisturbed thereby and supplemental adjustment producing under size pieces prevented. On the contrary, if for any reason the pieces are still running a measurable amount over the determined size the adjusting mechanism is completely reset for further automatic feeding. The extent of feeding for each completion of the solenoid circuit may be variably limited by adjustment of the end stop screws 115 for the piston to limit its movement in either direction, and also by suitable adjustment of the screw 45 which serves to control the point of engagement and disengagement of the pawl from the feed ratchet.

From the foregoing description the construction and operation of the present improved mechanism for preventing the production of over-size work pieces should be readily understood and it will be noted that the work may be automatically passed in a continuous stream through the grinding throat. As so passed work pieces in excess of the predetermined size will exert a frictional drag against the sizing device compensator control as a result of which an appreciable movement of the circuit competing members is rendered possible for very slight variation in work diameter and consequently a much more accurate control attained than is possible with ordinary thickness calipers or the like depending on multiplying mechanism for effecting ultimate movement of control parts. It will further be noted that on account of the delayed return and temporary circuit interruption features shuttling of the operating valve and piston and consequent excessive feed adjustments are prevented and that we have therefore provided a device of maximum simplicity, efficiency and accuracy.

It will further be noted that the size determinating mechanism in question is readily utilizable for imparting feeding movement to any machine in which the completed work pieces after discharged from the machine may be caused to pass successively in engagement with the work contacting feeler and will serve to effect proper adjustment of the work support and tool one relative to the other irrespective of whether the adjustment be of the tool or of the work support and that in either event accurate size maintenance and prevention of production of over-size work pieces due to the wear of the grinding wheel or other cutting tool is most satisfactorily effected.

We claim:

1. The combination with a tool and means for supporting work in operative relation to the tool, means supporting said parts for adjustment one with respect to the other, hydraulic means for effecting such adjustment, and an electrical controlled circuit including a work actuated feeler member for controlling the operation of the hydraulic adjusting means.

2. In a metal removing machine, the combination with a cutting tool and a work supporting means for maintaining work in operative relation to the tool, of means supporting said parts for feeding movement one relative to the other, hydraulic means for effecting a step by step feeding movement of the parts, an electrical control circuit for said hydraulic means, a work actuated switch member having a contact shoe disposed in the path of an oversize work piece whereby engagement of the work piece with the shoe will cause completion of the electric circuit and means for automatically deenergizing the control circuit at the completion of an individual feed movement.

3. In a feeding mechanism, the combination of an oscillatable member for effecting predetermined feed increments upon oscillation thereof in one direction, means for imparting a rapid feed oscillation and a retarded return movement to the member including an hydraulically operated actuating member and an electrical control circuit for determining the actuation thereof.

4. In a feeding mechanism, the combination of an oscillatable member for effecting predetermined feed increments upon oscillation thereof in one direction, means for imparting a rapid feed oscillation and a retarded return movement to the member including an hydraulically operated actuating member and an electrical control circuit for determining the actuation thereof, said control circuit including a work actuated switch member.

5. In a feeding mechanism the combination of an oscillatable member for effecting predetermined feed increments upon oscillation thereof in one direction, means for imparting a rapid feed oscillation and a retarded return movement to the member said means including an hydraulically operated actuating member and an electrical control circuit for determining the actuation thereof, said control circuit including a work actuated switch member, a circuit interrupter and connections between the circuit interrupter and feed mechanism for actuating the interrupter to deenergize the control circuit on completion of a predetermined feed movement.

6. In a feeding mechanism the combination of an oscillatable member for effecting predetermined feed increments upon oscillation thereof in one direction, means for imparting a rapid feed oscillation and a retarded return movement to the member said means including an hydraulically operated actuating member and an electrical control circuit for determining the actuation thereof, said control circuit including a work actuated switch member, a circuit interrupter and connections between the circuit interrupter, and feed mechanism for actuating the interrupter to de-energize the control circuit on completion of a predetermined feed movement and means for automatically shifting the interrupter into circuit closing position during the non-feeding oscillation of the feed control member.

7. The combination with a tool, of means for supporting work pieces during and subsequent to the operation of the tool thereon, means for causing a traversing movement of the work, a feeler positioned to engage a supported work piece subsequent to the operation of the tool thereon, hydraulic means for effecting an intermittent feed movement of the tool and work support one relative to the other and means operative by frictional resistance of an oversize work piece during relative traversing of the work and feeler for effecting actuation of the hydraulic feed mechanism.

8. The combination with a machine for removing material from work including a tool, opposed work supporting means and means for imparting feeding movement to said parts one relative to the other, of a control mechanism for said feeding means including a feeler projecting into the path of movement of discharged work pieces for determining the thickness thereof, a control circuit completable by said feeler when engaged by oversize work pieces, an oscillatable feed actuator, means coupling the actuator and control circuit for effecting successive oscillations of the actuator while the control circuit is closed and means for retarding non-effective oscillations of the actuator to permit progression of successive work pieces into engagement with the feeler during said oscillation.

9. In a feed mechanism the combination of a rotatable ratchet member, an oscillatable pawl carrier for cooperation therewith having a pawl operative in one direction of movement to engage and advance the ratchet, a piston coupled with the pawl carrier for effecting the oscillation thereof, means for rapidly shifting the piston and pawl carrier in a feeding direction, means for slowing down the rate of reverse movement of said parts, a double end cylinder for the piston, a valve chamber having inlet and outlet ports, a valve in the chamber for selectively coupling opposite ends of the cylinder respectively with the inlet and outlet ports, electrically operated means for shifting the valve in one direction and resilient means for urging the valve in the opposite direction when the electrical means are rendered ineffective.

10. In a feed mechanism the combination of a rotatable ratchet member, an oscillatable pawl carrier for cooperation therewith having a pawl operative in one direction of movement to engage and advance the ratchet, a piston coupled with the pawl carrier for effecting the oscillation thereof, means for rapidly shifting the piston and pawl carrier in a feeding direction, means for slowing down the rate of reverse movement of said parts, a double end cylinder for the piston, a valve chamber having inlet and outlet ports, a valve in the chamber for selectively coupling opposite ends of the cylinder respectively with the inlet and outlet ports, electrically operated means for shifting the valve in one direction, resilient means for urging the valve in the opposite direction when the electrical means are rendered ineffective, and means coupled with the carrier-piston mechanism for alternately completing and breaking the electric circuit in predetermined relation to the shifting of the parts.

11. In a feed mechanism the combination of a rotatable ratchet member, an oscillatable pawl carrier for cooperation therewith having a pawl operative in one direction of movement to engage and advance the ratchet, a piston coupled with the pawl carrier for effecting the oscillation thereof, means for rapidly shifting the piston and pawl carrier in a feeding direction, means for slowing down the rate of reverse movement of said parts, a double end cylinder for the piston, a valve chamber having inlet and outlet ports, a valve in the chamber for selectively coupling opposite ends of the cylinder respectively with the inlet and outlet ports, electrically operated means for shifting the valve in one direction, resilient means for urging the valve in the opposite direction when the electrical means are rendered ineffective, means coupled with the carrier piston mechanism for alternately completing and breaking the electric circuit in predetermined relation to the shifting of the parts, said means including a lost motion connection and a load and fire mechanism for completing the movement initiated by engagement between the lost motion connection parts.

12. In a feed mechanism the combination of a rotatable ratchet member, an oscillatable pawl carrier for cooperation therewith having a pawl operative in one direction of movement to engage and advance the ratchet, a piston coupled with the pawl carrier for effecting the oscillation thereof, means for rapidly shifting the piston and pawl carrier in a feeding direction, means for slowing down the rate of reverse movement of said parts, a double end cylinder for the piston, a valve chamber having inlet and outlet ports, a valve in the chamber for selectively coupling opposite ends of the cylinder respectively with the inlet and outlet ports, electrically operated means including an electrical circuit for shifting the valve in one direction, and resilient means for urging the valve in the opposite direction when the electrical means are rendered ineffective, said electrical circuit including a normally open switch and a work engaging feeler operatively associated therewith for shifting the same into circuit closing position.

13. The combination with a centerless grinder including grinding and regulating wheels, supporting rest for guiding successive work pieces during their movement through the machine, said rest having an extension at the discharge side of the machine, of a work engaging feeler, means supporting the feeler in predetermined relation to the rest for engagement with a discharged work piece moving there-along, feed mechanism for varying the relative separation of the grinding and regulating wheels to determine the diameter of finished work piece and connections between the feeler and feed mechanism for actuation of said mechanism on shifting of the feeler by engagement therewith of an oversize discharge work piece.

14. The combination with a centerless grinder including grinding and regulating wheels, supporting rest for guiding successive work pieces during their movement through the machine, said rest having an extension at the discharge side of the machine, of a work engaging feeler, means supporting the feeler in predetermined relation to the rest for engagement with a discharged work piece moving there-along, feed mechanism for varying the relative separation of the grinding and regulating wheels to determine the diameter of finished work piece, connections between the feeler and feed mechanism for actuation of said mechanism on shifting of the feeler by engagement therewith of an oversize discharged work piece, and means for adjusting the relative position of the feeler and work rest.

15. The combination with a centerless grinder including grinding and regulating wheels, supporting rest for guiding successive work pieces during their movement through the machine said rest having an extension at the discharge side of the machine, of a work engaging feeler, means supporting the feeler in predetermined relation to the rest for engagement with a discharged work piece moving there-along, feed mechanism for varying the relative separation of the grinding and regulating wheels to determine the diameter of finished work piece, connections between the feeler and feed mechanism for actuation of said mechanism on shifting of the feeler by engagement therewith of an oversize discharged work piece, and means for adjusting the relative position of the feeler and work rest, said means including a slide carrying the feeler and a support for the slide carried by the machine and a member rotatably secured to one of said two last named parts and having threaded engagement with the other for effecting their relative adjustment.

16. The combination with a centerless grinder including grinding and regulating wheels, supporting rest for guiding successive work pieces during their movement through the machine said rest having an extension at the discharge side of the machine, of a work engaging feeler, means supporting the feeler in predetermined relation to the rest for engagement with a discharged work piece moving therealong, feed mechanism for varying the relative separation of the grinding and regulating wheels to determine the diameter of finished work piece, connections between the feeler and feed mechanism for actuation of said mechanism on shifting of the feeler by engagement therewith of an oversize discharged work piece, and means for adjusting the relative position of the feeler and work rest, said means including a slide carrying the feeler and a support for the slide carried by the machine, a plunger swiveled to the slide, a sleeve receiving the plunger and in threaded engagement with the support, and means for locking the plunger in longitudinally adjusted position relative to the sleeve whereby coarse adjustment of the parts may be effected by direct sliding movement of the plunger and fine supplemental adjustments effected by rotation of the threaded sleeve.

17. In a feed mechanism the combination of a rotatable ratchet member, an oscillatable pawl carrier for cooperation therewith having a pawl operative in one direction of movement to engage and advance the ratchet, a piston coupled with the pawl carrier for effecting the oscillation thereof, means for rapidly shifting the piston and pawl carrier in a feeding direction, and means for slowing down the rate of reverse movement of the parts, said means including a valve chamber having an inlet and a pair of outlet ports, a valve in the chamber for selectively coupling the inlet port with opposite ends of the piston for actuation thereof and for correspondingly connecting the opposite end of the piston with one of the outlet ports, one of said outlet ports being unobstructed and the other having a valve member for variably restricting the discharge therethrough.

In testimony whereof we affix our signatures.

CLEMENT BOOTH.
FREDERICK S. HAAS.